No. 628,530. Patented July 11, 1899.
A. GOZZARD.
ROCK DRILL AND ROCK DRILL BIT, &c.
(Application filed Oct. 15, 1898.)
(No Model.) 2 Sheets—Sheet 2.
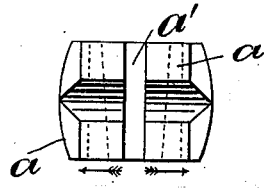
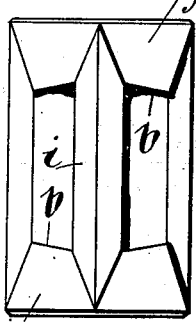
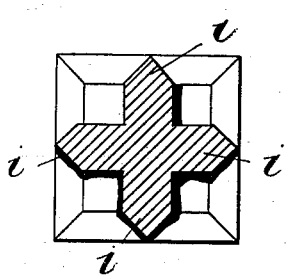
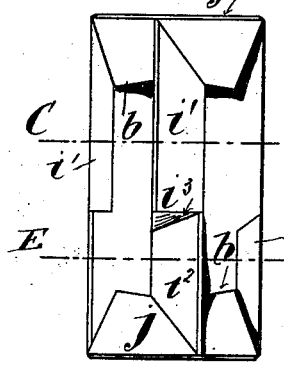
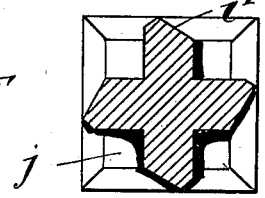
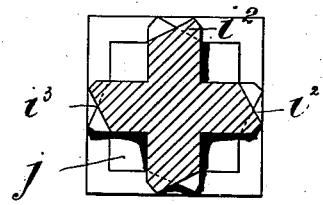
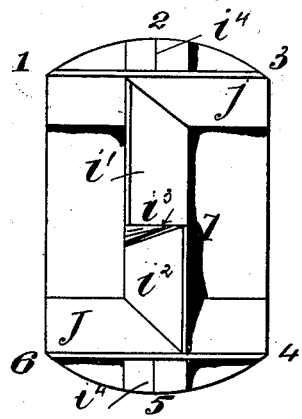
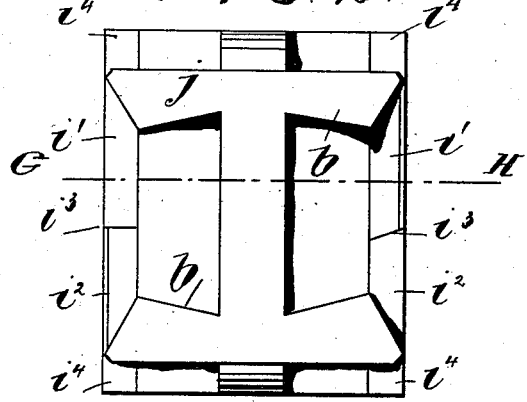
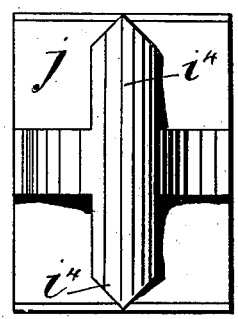
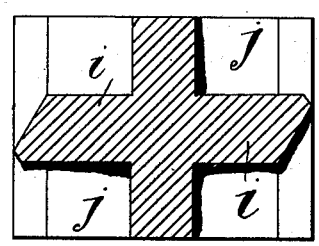
Witnesses
Inventor
Alfred Gozzard
By his atty Richardson
THE NORRIS PETERS CO., PHOTO-LITHO., WASHINGTON, D. C.

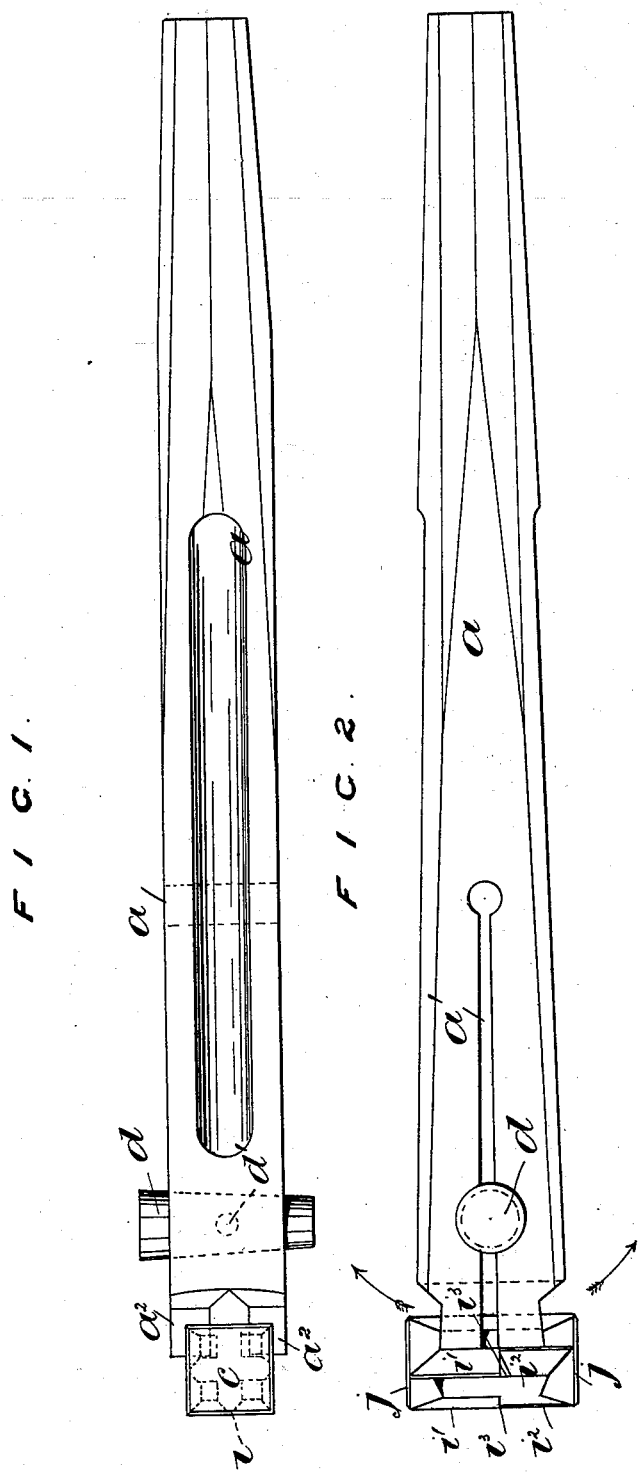

UNITED STATES PATENT OFFICE.

ALFRED GOZZARD, OF SHEFFIELD, ENGLAND, ASSIGNOR TO RICHARD NICHOLSON AND ROBERT JAMES NICHOLSON, OF SAME PLACE.

ROCK-DRILL AND ROCK-DRILL BIT, &c.

SPECIFICATION forming part of Letters Patent No. 628,530, dated July 11, 1899.

Application filed October 15, 1898. Serial No. 693,622. (No model.)

*To all whom it may concern:*

Be it known that I, ALFRED GOZZARD, engineer, a subject of the Queen of Great Britain and Ireland, residing at 37 Wolseley road, Sheffield, in the county of York, England, have invented certain new and useful Improvements in or Connected with Hand and Machine Rock-Drills, Hand and Machine Rock-Drill Bits, and Analogous Drilling or Boring Apparatus, (for which a patent has been applied for in Great Britain, No. 18,773, dated September 2, 1898,) of which the following is a specification.

My said invention relates to improvements in or connected with hand and machine rock-drills, hand and machine rock-drill bits, and analogous drilling or boring apparatus.

The object of my invention is to reduce the labor and cost of handling and operating the machines in the mines, avoiding the somewhat costly process and delay occasioned by the resharpening of the drills, and also to effect improvements in the construction of the drills or bits.

In carrying my invention into effect I provide a drill so constructed that the drill or cutting extremity is securely attachable to and detachable from the holder or shank.

In order that my invention may be fully understood, I have attached hereto two sheets of explanatory drawings, to which I will now refer.

Figure 1 is a side view of my improved holder, with one form of my detachable cutters in position therein. Fig. 2 is a plan of same. Fig. 3 is an end view of the holder. Fig. 4 is a face view of one of my improved cutters. Fig. 5 is a cross-section. Fig. 6 is a face view of a modified form of cutter. Fig. 7 is a cross-section on the line C D. Fig. 8 is a cross-section on the line E F. Fig. 9 is a face view of another form of cutter. Fig. 10 is a view at right angles to Fig. 9. Fig. 11 is an end view, and Fig. 12 is a cross-sectional view.

In constructing my improved holder and detachable cutter I split the holder $a$ in one or more convenient directions, as shown at $a'$ in the plan view, Fig. 2, and in end view, Fig. 3, so as to provide the cutter with flexible jaws. The jaws of the holder $a$ are formed with dovetails $a^2$ $a^2$, (see Fig. 2,) which are adapted to engage with corresponding dovetail abutments $b$, formed on the cutter $c$. A taper bolt $d$ or wedge is inserted in a corresponding taper hole or recess in the slit $a'$, formed in the holder, so that the jaws of the holder $a$ can be readily expanded in the direction of the arrows. The expanded dovetail jaws of the holder $a$ are thus brought to bear with great pressure against the abutments $b$ of the cutter $c$, and the same is thus securely gripped and held in position in the holder. More than one such taper bolt or wedge could be employed, if desired.

The detachable cutters are provided with one or more cutting faces or surfaces. Where more than one cutting-face is provided, as one working surface becomes blunted by use the cutter can be turned in the holder so as to bring a fresh cutting-face into operation. The cutter, for instance, may be formed square, so as to be provided with four cutting-surfaces.

One form of my detachable cutters or drills (shown in Figs. 1 to 5) is provided with four cutting-faces with cutting or knife edges of ┝━━━┥ shape, although less than four cutting-faces may be used, if desired. The cutting-faces are formed by a central longitudinal web $i$ and outer transverse edges formed on opposite parallel limbs $j\,j$. The central longitudinal web may be formed with two opposite bevels $i'\,i^2$, as shown in Figs. 6 to 8. The bevel $i'$ is continued for a distance in excess of half the length of the web. This arrangement of oppositely-disposed bevels provides an additional cutting edge $i^3$. The outer transverse cutting edges are formed by beveling the outer edge of the opposite parallel limbs $j\,j$ of the ┝━━━┥-shaped cutter.

A further modified form of tool or cutter is shown in Figs. 9 to 12 with similar abutments. This form is obtained by means of a design in all respects similar to the cutter already described, save that the central web $i$ of the ┝━━━┥ shape is also formed with oppositely-arranged bevels, but produced at $i^4\,i^4$ beyond the transverse parallel limbs $j\,j$. This forms a double star or cross and is very effective, providing, as it does, seven cutting edges, numbered 1 to 7 in the drawings.

In Figs. 9 to 12 the cutter is formed with two cutting-surfaces, although it may be formed with one only or four, if desired. Fig. 10 shows more clearly the beveled abutments $b$ for the reception of the expandible jaws of the holder $a$. Fig. 11 is a plan view of the cutter, showing the beveled edges of the extended portions $i^4$ of the web $i$. Fig. 9 is a cross-sectional view on the line G H, Fig. 10, showing the cutting edges of the web $i$.

I claim as my invention—

1. A cutter comprising a central cutting edge, transversely-extending portions at each end of the central edge, said portions having thereon cutting edges and having also dovetailed abutments adjacent to said cutting edges and forming recesses larger at their inner ends whereby the transverse portions provide the cutting and holding means, substantially as described.

2. A cutter comprising a central cutting edge, and an edge at each end of the central edge extending transversely of and beyond the same with dovetailed abutments located to one side of the central edge to receive dovetailed parts on the holder, said central edge being provided with oppositely-arranged bevels and being also produced beyond the transverse edges, substantially as described.

3. In combination, the reversible cutter having the central and transverse cutting edges with dovetail recesses and the holder having the split end with separated dovetails $a^2$ one on each side of the central edge with the taper plug for spreading the parts, substantially as described.

4. In combination, the holder having a split end with dovetail portions to engage the cutter, and a cutter having a plurality of cutting-faces with dovetailed abutments to engage the dovetail portions of the holder, substantially as described.

In witness whereof I have hereunto set my hand in presence of two witnesses.

ALFRED GOZZARD.

Witnesses:
RICHARD NICHOLSON,
RICHARD WHEELER.